US011105298B2

(12) United States Patent
Cingal et al.

(10) Patent No.: US 11,105,298 B2
(45) Date of Patent: Aug. 31, 2021

(54) POGO EFFECT CORRECTION SYSTEM

(71) Applicant: ARIANEGROUP SAS, Paris (FR)

(72) Inventors: Benoit Mathieu André Cingal, Vernon (FR); Jesus Llanos Garcia, Valladolid (ES)

(73) Assignee: ARIANEGROUP SAS, Paris (FR)

( * ) Notice: Subject to any disclaimer, the term of this patent is extended or adjusted under 35 U.S.C. 154(b) by 317 days.

(21) Appl. No.: 16/463,435

(22) PCT Filed: Nov. 24, 2017

(86) PCT No.: PCT/FR2017/053248
§ 371 (c)(1),
(2) Date: May 23, 2019

(87) PCT Pub. No.: WO2018/100274
PCT Pub. Date: Jun. 7, 2018

(65) Prior Publication Data
US 2021/0115878 A1  Apr. 22, 2021

(30) Foreign Application Priority Data
Dec. 2, 2016  (FR) ........................ 1601711

(51) Int. Cl.
*F02K 9/44* (2006.01)
*B64G 1/40* (2006.01)
*F02K 9/60* (2006.01)

(52) U.S. Cl.
CPC ............... *F02K 9/44* (2013.01); *B64G 1/401* (2013.01); *B64G 1/402* (2013.01); *F02K 9/60* (2013.01); *F05D 2250/14* (2013.01)

(58) Field of Classification Search
CPC .. F02K 9/44; F02K 9/60; B64G 1/401; B64G 1/402
See application file for complete search history.

(56) References Cited

U.S. PATENT DOCUMENTS 2,887,844 A * 5/1959 Coty .................... F02K 9/44
60/258
3,306,038 A * 2/1967 Ferriman ............... F02K 9/44
60/794
(Continued)

FOREIGN PATENT DOCUMENTS

FR    2975440 A1    11/2012
FR    3032238 A1 *  8/2016   ............... F02K 9/50
(Continued)

OTHER PUBLICATIONS

Swanson, Luke, Design Analysis of the Ares I POGO Accumulator, Aug. 5, 2009, AIAA (Year: 2009).*
(Continued)

*Primary Examiner* — Todd E Manahan
*Assistant Examiner* — Kyle Robert Thomas
(74) *Attorney, Agent, or Firm* — Bookoff McAndrews, PLLC

(57) ABSTRACT

A pogo effect corrector system for a liquid propellant feed system of a rocket engine includes a liquid propellant feed pipe portion, and a hydraulic accumulator including a tank connected firstly to the feed pipe portion firstly via at least one take-off passage opening out into a take-off segment of the feed pipe portion, and secondly via at least one rejection passage opening out into the tank at an intermediate level lying between the at least one take-off passage and the top of the tank, wherein the feed pipe portion possesses a constriction segment where the flow section of the feed pipeline portion is less than the flow section of the take-off segment, and wherein at least one rejection passage opens out into the feed pipeline portion in the constriction segment.

12 Claims, 5 Drawing Sheets

(56) References Cited

U.S. PATENT DOCUMENTS

| | | | | |
|---|---|---|---|---|
| 4,039,000 | A | * | 8/1977 | Fletcher .................... F02K 9/46 |
| | | | | 137/207 |
| 9,528,470 | B2 | * | 12/2016 | Kernilis .................... F02K 9/96 |
| 2014/0174054 | A1 | * | 6/2014 | Kernilis .................... F02K 9/50 |
| | | | | 60/204 |
| 2017/0226965 | A1 | * | 8/2017 | Le Gonidec .............. F02K 9/56 |
| 2018/0030928 | A1 | * | 2/2018 | Verplancke ............ B64G 1/401 |

FOREIGN PATENT DOCUMENTS

| | | | | |
|---|---|---|---|---|
| FR | | 3026440 B1 * | 10/2016 | ............... F02K 9/60 |
| WO | WO 2016/120571 A1 | | 8/2016 | |

OTHER PUBLICATIONS

Payne, J.G., POGO Suppression on the Delta Vehicle, Jun. 7, 1974, Aerospace Corporation (Year: 1974).*

International Search Report and Written Opinion dated Feb. 22, 2018, in corresponding International Application No. PCT/FR2017/053248 (10 pages).

* cited by examiner

POGO EFFECT CORRECTION SYSTEM

CROSS-REFERENCE TO RELATED APPLICATIONS

This application is the U.S. national phase entry under 35 U.S.C. § 371 of International Application No. PCT/FR2017/053248, filed on Nov. 24, 2017, which claims priority to French Patent Application No. 1601711, filed on Dec. 2, 2016.

FIELD OF THE INVENTION

The present disclosure relates to a pogo effect corrector system for a system feeding liquid propellant to a rocket engine.

Such a pogo effect corrector system may be used for any type of liquid propellant and for any type of rocket engine, whether civilian or military.

STATE OF THE PRIOR ART

In the field of liquid propellant rocket engines, the name "pogo effect" has been given to a liquid propellant in the rocket engine feed circuit entering into resonance with the mechanical oscillations of the rocket. Since the thrust of the rocket engine varies with the rate at which propellant is delivered by the feed circuit, such an entry into resonance can cause oscillations that diverge rapidly and can thus give rise to difficulties of guidance, and even to damage that can go as far as total loss of the payload or indeed of the vehicle. The pogo effect name is not derived from an acronym, but rather from pogo stick toys that are constituted by a rod with a spring that bounces in a way that reminded technicians of the violent longitudinal oscillations of rockets that are caused by this effect. Since the beginning of the development of liquid propellant rockets, it has therefore been very important to provide systems for correcting the pogo effect. The term "pogo effect corrector system" is used to mean any system suitable for eliminating pogo oscillations completely or for limiting them to a magnitude that is small enough to avoid leading to difficulties of guidance or to damage to the vehicle.

Among pogo effect corrector systems, systems of capacitive type are known in particular, e.g. as disclosed in French patent No. 2 975 440. In such a system, the tank of a hydraulic accumulator is arranged around the pipe of a liquid propellant feed line of the rocket engine (e.g. the line feeding liquid oxygen (LOx)), and it communicates with that feed pipe via communication orifices formed in its lower portion. A constant flow of gas (e.g. helium (He)) is injected into the upper portion of the tank so as to maintain a bubble of gas in the tank, and a rejection dip tube connects the liquid-gas interface to the liquid propellant feed pipe, with a pressure drop being maintained at the outlet from the rejection tube in order to ensure that excess gas is sucked from the liquid-gas interface.

In known capacitive corrective system architectures, that suction is generated firstly by the difference in level between the two ends of the rejection tube, leading to hydrostatic suction, and secondly by a portion of tube that is pierced by orifices projecting into the fuel feed pipe, the high speed of the propellant going past that projecting portion of tube giving rise to hydrodynamic suction through the orifices in the rejection tube.

Nevertheless, certain rocket engine configurations make installing such a rejection system difficult or ineffective. In particular, the feed systems of certain rocket engines possess a pipe with a bend: under such circumstances, flow lines are disturbed in the pipe, making the hydrodynamic suction unstable or even non-existent in the rejection tube. In addition, such a bend shape generally requires the rejection tube to be shortened, thereby also reducing the hydrostatic component of the suction.

Furthermore, certain rocket engines are designed to operate in microgravity, eliminating the hydrostatic suction of the rejection tube, or to operate at varying powers, thereby greatly reducing the hydrodynamic suction during low power operation when the speed of the propellant in the pipe is small.

In addition, it is nowadays preferred to fabricate such systems by additive manufacturing, and unfortunately such a tube portion projecting into the pipe is difficult to make using such additive manufacturing techniques.

Under such circumstances, in order to solve the problems raised by such a rejection tube, proposals have been made to eliminate the tube and to replace it with a drain rejecting excess gas into the vacuum outside the vehicle. Nevertheless, that solution is not fully satisfactory since it leads to overconsumption of propellants, given that the drain periodically rejects propellant away from the vehicle when the volume of the gas bubble decreases, e.g. during stages when the pressure in the feed pipe rises.

There therefore exists a real need for a pogo effect corrector system for a liquid propellant feed system of a rocket engine that does not suffer from the drawbacks inherent to the above-mentioned known configurations, or that suffers from them less.

SUMMARY OF THE INVENTION

The present disclosure provides a pogo effect corrector system for a liquid propellant feed system of a rocket engine, the corrector system comprising a liquid propellant feed pipe portion, a hydraulic accumulator comprising a tank provided with a gas feed and connected firstly to the feed pipe portion via at least one take-off passage opening out into a take-off segment of the feed pipe portion, and secondly via at least one rejection passage opening out into the tank at an intermediate level lying between said at least one take-off passage and the top of the tank, wherein the feed pipe portion possesses a constriction segment where the flow section of the feed pipe portion is less than the flow section of the take-off segment, and wherein said at least one rejection passage opens out into the feed pipe portion at the constriction segment.

By the Venturi effect, the reduction of the flow section in the constriction segment gives rise to an increase in the speed of the propellant as it passes through the constriction segment, thereby forming a suction zone at the rejection orifices through which the rejection passage opens out into the pipe portion.

Such suction then serves to drain excess gas effectively from the liquid-gas interface of the tank of the hydraulic accumulator, even under conditions of microgravity or of low power operation when the flow rate of propellant upstream from the constriction segment is low.

Such a configuration also makes it possible to avoid having a tube that projects into the pipe portion: the flow of propellant is thus less disturbed, thereby avoiding in particular a wake phenomenon, and making additive manufacturing easy to perform. In particular, such a configuration, which is very compact, is well adapted to pipe portions forming a bend. In addition, the absence of the rejection tube enables the overall mechanical strength to be increased, since the presence of a tube in the flow can lead to undesirable resonance phenomena when its own resonant frequencies are poorly tuned.

In certain embodiments, the pipe portion is configured to be connected upstream to a feed of liquid propellant, e.g. liquid oxygen, and it is connected downstream to a combustion chamber.

In certain embodiments, the take-off segment is situated downstream from the constriction segment.

In certain embodiments, going from upstream to downstream, the flow section of the feed pipe portion decreases, reaches a minimum in the constriction segment, and increases once more prior to reaching the take-off segment. Firstly, this enables the upstream and downstream ends of the pipe portion to have a nominal diameter, thereby making it easier to integrate in the remainder of the feed system, e.g. by using conventional annular flanges. Secondly, this makes it possible to obtain a localized increase in speed and suction solely in the vicinity of the constriction segment, without affecting the speed or the pressure of the propellant upstream and downstream from the pipe portion.

In certain embodiments, the flow section in the constriction segment is at least 1% and preferably at least 20% less than the flow section of the take-off segment. Such a reduction in the flow section serves to obtain sufficient suction to provide appropriate drainage via the rejection passage.

In certain embodiments, the flow section of the feed pipe portion varies continuously, preferably in differentiable manner. Such regularity in the flow section, and thus in the profile of the inside wall of the pipe portion, without any discontinuity or sudden change of slope, serves to reduce the impact of the constriction on the flow and thus to reduce any risk of hydrodynamic disturbances appearing in the flow of propellant.

In certain embodiments, the diameter of the feed pipe portion is reduced at the constriction segment. This is a simple manner of reducing the flow section.

In certain embodiments, the constriction segment possesses a cross-section that is circular. Such a configuration is particularly easy to make.

In certain embodiments, the diameter of the feed pipe portion is constant all along the feed pipe portion. It should be recalled that for any outline, its diameter is the upper limit of distances between any two points of that outline. In other words, in such embodiments, the flow section is reduced while conserving the greatest distance segment unchanged: this enables the flow to be left unchanged or practically unchanged in certain flow tubes. For example, with a pipe portion having a bend, it is possible to reduce the head losses by providing the majority of the narrowing away from the plane of the bend.

In certain embodiments, the constriction segment possesses a cross-section that is elliptical. Such an elliptical section serves firstly to limit the constriction, and thus any disturbance to the flow, in the vicinity of the major axis of the ellipse, and secondly to release a greater volume outside the pipe portion in the vicinity of the ends of its minor axis, e.g. in order to install equipment and in particular to install the rejection passage.

In certain embodiments, the major axis of the elliptical section is of constant length.

In certain embodiments, the feed pipe portion presents a bend. As explained above, the pogo effect corrector system of the present disclosure is particularly adapted to bend configurations.

In certain embodiments, the width of the feed pipe portion is constant in the plane of the bend. This serves to reduce any risk of the flow separating on the inside of the bend, thus reducing potential head losses.

In certain embodiments, the tank of the hydraulic accumulator surrounds the feed pipe portion, at least in part.

In certain embodiments, the tank of the hydraulic accumulator surrounds the feed pipe portion completely, and preferably in axisymmetric manner. Such a configuration is particularly adapted to axisymmetric configurations.

In certain embodiments, the tank of the hydraulic accumulator extends on the outside of the bend formed by the feed pipe portion, preferably symmetrically relative to the plane of the bend. In particular, it may extend over about 180°. This configuration serves to take best advantage of available space constraints imposed by this bend configuration.

In certain embodiments, the rejection passage opens out into the feed pipe portion via at least two rejection orifices that are spaced apart by at least 30°. Certain shapes for the pipe portion, in particular bend shapes, can lead to instabilities in the flow, and thus to local irregularities of speed and pressure: such a configuration then makes it possible to counter this risk of a localized reduction in suction at any particular rejection orifice.

In certain embodiments, the rejection passage opens out into the feed pipe portion via at least two diametrically opposite rejection orifices. Such a configuration is particularly robust in the face of fluctuations of pressure in the pipe portion.

In certain embodiments, the rejection passage opens out into the feed pipe portion via at least one rejection orifice situated on the minor axis of the ellipse formed by the cross-section of the constriction segment. As mentioned above, this configuration is particularly compact and thus makes it possible to avoid degrading the overall size occupied by the pipe portion, thereby not impeding the passage of other pieces of equipment such as bolts for fastening the upstream and downstream flanges of the pipe portion. Thus, and preferably, no rejection orifice is provided outside an angular zone of 40° centered on the minor axis of the ellipse.

In certain embodiments, the rejection passage opens out into the feed pipe portion via a plurality of rejection orifices distributed all around the feed pipe portion. This makes it possible to maximize protection against pressure variations in the pipe portion.

In certain embodiments, the rejection passage includes an annular manifold surrounding the constriction segment of the feed pipe portion. Such a manifold is particularly useful when the tank of the hydraulic accumulator is provided on one side only of the pipe portion.

In certain embodiments, the rejection passage opens out into the tank via at least two distinct orifices. This makes it possible to limit the sensitivity of the system to lateral accelerations that could modify the shape of the liquid-gas interface in the tank of the hydraulic accumulator.

In certain embodiments, the rejection passage opens out into the tank via a plurality of orifices distributed all along one side of the tank, e.g. its inner annular side. This makes it possible to maximize protection against changes in the shape of the liquid-gas interface due to lateral accelerations.

In certain embodiments, the rejection passage includes a rejection duct running along or penetrating into the tank of the hydraulic accumulator.

In certain embodiments, the rejection passage is constituted by one or more orifices formed through the wall of the feed pipe portion. The rejection passage is then constituted by no more than mere orifices formed through the wall between the pipe portion and the tank of the hydraulic accumulator. Such a configuration, which is particularly well adapted to axisymmetric configurations, is very simple and compact.

In certain embodiments, the gas feed delivers an inert gas such as helium.

In certain embodiments, the hydraulic accumulator does not have any element projecting into the feed pipe portion.

In certain embodiments, the pogo effect corrector system is a single piece, preferably made by additive manufacturing. By way of example, it may be made out of a nickel-based alloy or out of an aluminum-based alloy.

The present disclosure also provides a rocket engine including a pogo effect corrector system in accordance with any of the above embodiments.

The present disclosure also provides a vehicle including at least one rocket engine in accordance with the disclosure.

In the present disclosure, the terms "longitudinal", "transverse", "axial", "radial", "tangential", "inner", "outer", and their derivatives are defined relative to the curvilinear direction of the pipe portion; the term "axial plane" designates a plane containing the curvilinear direction of the pipe portion, while the term "radial plane" designates a plane perpendicular to that curvilinear direction; the terms "lower" and "upper" and their derivatives are defined relative to the local direction of gravity, whether natural or artificial; finally, the terms "upstream" and "downstream" are defined relative to the flow of propellant in the pipe portion.

The above-mentioned characteristics and advantages, and others, appear on reading the following detailed description of embodiments of the proposed device and method. This detailed description refers to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of an element) that are identical are identified by the same reference signs. In addition, elements (or portions of an element) forming parts of embodiments that are different but having functions that are analogous are identified in the figures by numerical references incremented by 100, 200, etc.

DETAILED DESCRIPTION OF EMBODIMENT(S)

In order to make the invention more concrete, embodiments of pogo effect corrector systems are described in detail below with reference to the accompanying drawings. It should be recalled that the invention is not limited to these embodiments.

Figure 1:
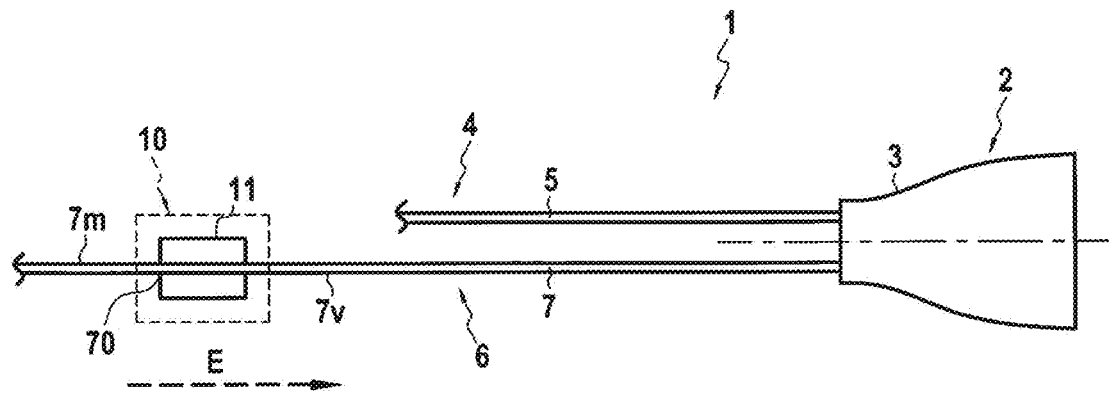
FIG. 1 is a diagram showing a space vehicle including a pogo effect corrector system in accordance with the disclosure.

FIG. 1 is a highly diagrammatic view of a space vehicle 1, such as a space launcher stage. The vehicle 1 includes a liquid propellant rocket engine 2. The rocket engine 2 has a propulsion chamber 3 comprising both a combustion chamber and a converging-diverging nozzle, in known manner.

The propulsion chamber 3 is fed with two liquid propellants by two feed systems 4 and 6, each having a respective propellant feed pipe 5 or 7. The first feed system 4 is shown in part only.

The second feed system 6 has a capacitive pogo corrector system 10, abbreviated below to PCS for convenience.

Throughout the present disclosure below, the terms "upstream" and "downstream" should be understood relative to the PCS 10, following the flow direction of the liquid propellant towards the rocket engine 2.

The PCS 10 comprises a hydraulic accumulator 11 and a portion 70 of a feed pipe. The feed pipe portion 70 is configured to be connected upstream to an upstream portion 7m of the feed pipe 7, and downstream to a downstream portion 7v of the feed pipe 7. The flow direction E of the liquid propellant is shown in the figures by an arrow. The upstream portion 7m and the downstream portion 7v are circular in section, for example.

Figure 2:
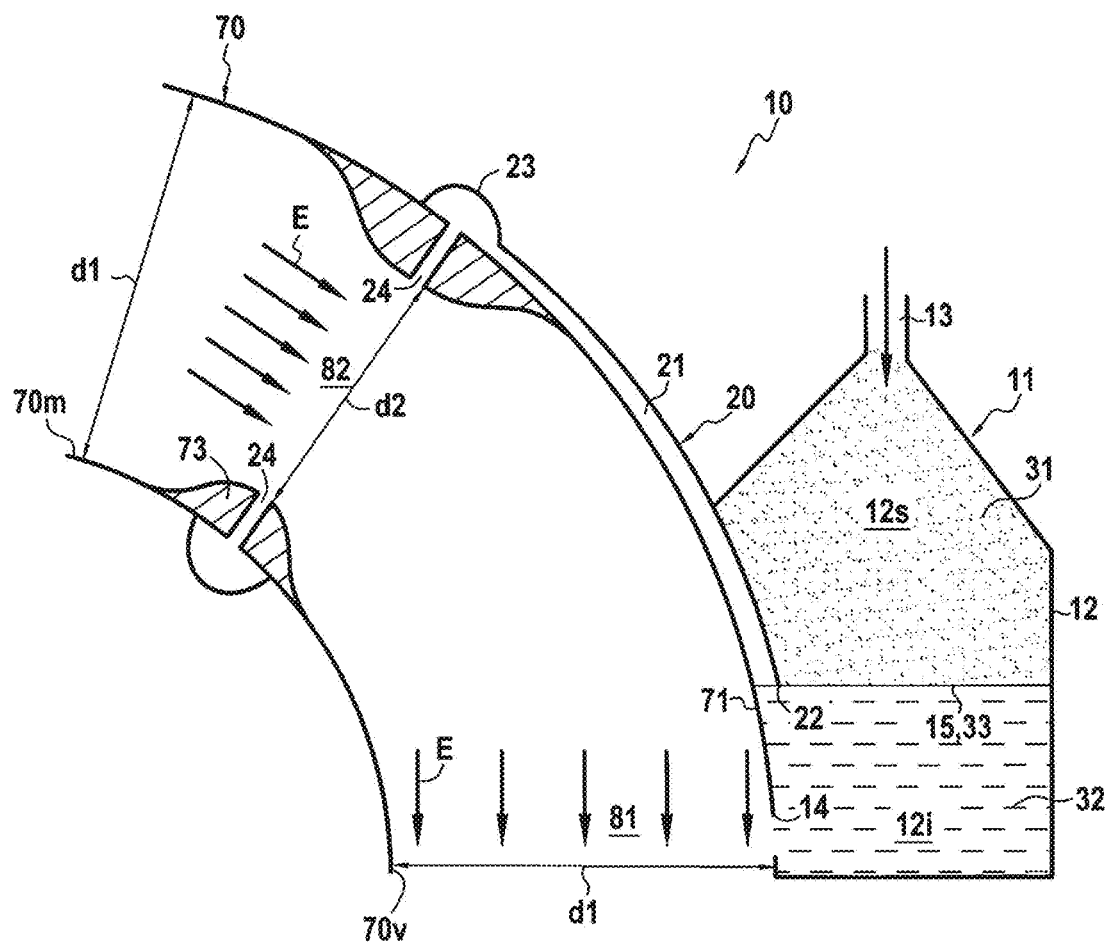
FIG. 2 is a diagrammatic section view of a first embodiment of a pogo effect corrector system.

FIG. 2 is a diagram showing a first example of such a PCS 10. In this example, the pipe portion 70 has a bend. All along it possesses a section that is circular, but its diameter varies between its upstream end 70m and its downstream end 70v. More precisely, its upstream and downstream ends 70m and 70v have the same diameter d1 corresponding to the nominal diameter of the pipe portion 70; in contrast, the pipe portion 70 possesses an intermediate constriction portion 82 where the wall 71 of the pipe portion 70 narrows, forming a bottle neck 73, by reducing the diameter of the pipe portion 70. Consequently, the diameter d2 of the constriction segment 82 is less than the nominal diameter d1 of the pipe portion 70 such that the flow section through the pipe portion 70 is reduced in the constriction portion 82.

Nevertheless, it should be observed that the wall 71 of the pipe portion 70 retains a profile that is continuous without any break of slope, even in the constriction segment 82.

Furthermore, the hydraulic accumulator 11 comprises a tank 12 and a gas injector 13 provided in an upper portion 12s of the tank 12, preferably at the top of the tank 12. The lower portion 12i of the tank 12 is connected to the feed pipe portion 70 by at least one take-off passage 14 that, in this example, is in the form of take-off orifices through the wall 71 of the feed pipe portion 70 in a take-off segment 81 situated downstream from the constriction segment 82 and of diameter equal to the nominal diameter d1 of the pipe portion 70. Thus, by means of the take-off passage 14, propellant coming from the pipe portion 70 can penetrate into the lower portion 12i of the tank 12.

In the present disclosure, the "upper" portion 12s of the tank 12 designates the portion of the tank 12 where the gas injected by the injector 13 tends to accumulate, given that its density is lower than the density of the liquid propellant flowing in the pipe 7, and because of the acceleration to which the PCS 10 is subjected while the rocket engine 2 is in operation. Conversely, the "lower" portion 12i of the tank 12 designates the portion of the tank 12 where liquid tends to accumulate because of its greater density, and because of the acceleration to which the PCS 10 is subjected while the rocket engine 2 is in operation.

The hydraulic accumulator 11 also has a rejection passage 20 opening out firstly into the tank 12 at an intermediate level 15 between the upper and lower portions 12s and 12i of the tank 12, and secondly into the feed pipe portion 70 in its constriction segment 82.

More precisely, in this example, the rejection passage 20 is in the form of a duct 21 running along the outside of the wall 71 of the pipe portion 70 and extending between an inlet 22 open in the intermediate portion 15 of the tank 12 and a manifold 23 surrounding the constriction portion 82 of the pipe portion 70, with rejection orifices 24 being formed through the wall 71 of the pipe portion 70 between the constriction segment 82 and the manifold 23, at regular intervals all around the constriction segment 82, where the diameter of the pipe portion 70 is at its minimum.

In a typical example, the liquid propellant flowing in the feed pipe 7 and the feed pipe portion 70 is liquid oxygen (LOx), and the gas injected by the injector 13 is helium (He).

While the rocket engine 2 is in operation, the injector 13 injects gas at a constant rate into the tank 12, thereby creating a volume of gas 31 that accumulates in the upper portion 12s of the tank 12, thus forming an interface 33 between the gas and the liquid propellant 32 present in the lower portion 12i of the tank 12.

Furthermore, as a result of the Venturi effect, the decrease in the flow section of the pipe portion 70 in its constriction segment 82 leads to the liquid propellant accelerating locally and to its pressure decreasing locally. Consequently, the pressure that exists at the rejection orifices 24 is lower than the pressure that exists in the tank 12 at the inlet 22 to the rejection passage 20: suction is therefore generated in the rejection passage 20 so that the excess gas going past the intermediate level 15 of the tank 12 is sucked in and discharged into the pipe portion 70.

The volume of gas 31 can thus be maintained substantially constant in the tank 12. Under such circumstances, it is possible to avoid pogo oscillations appearing by modifying the resonant frequencies of the feed pipe 70, as is well known.

Figure 3:
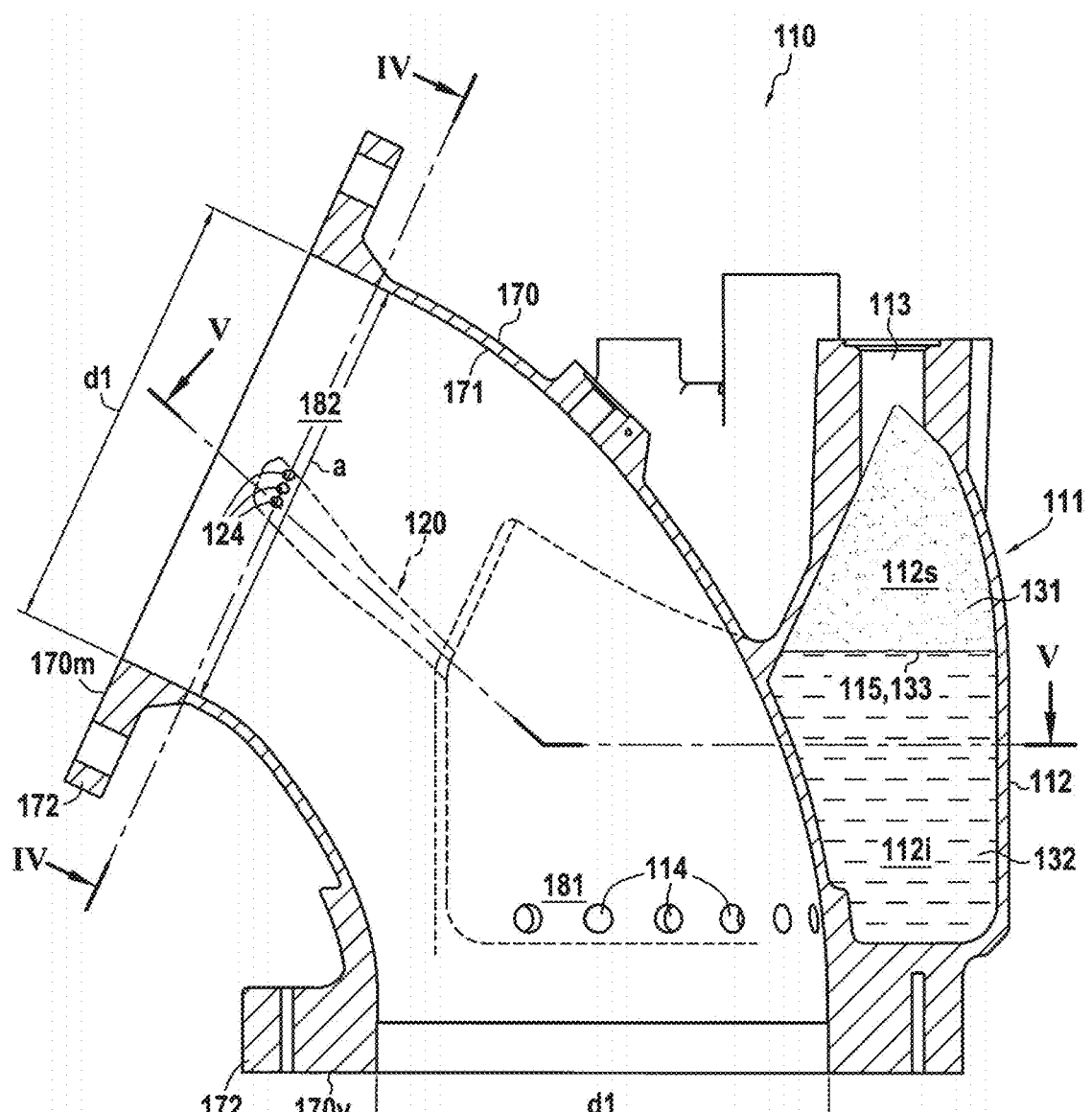
FIG. 3 is an axial section view of a second embodiment of a pogo effect corrector system.
Figure 4:
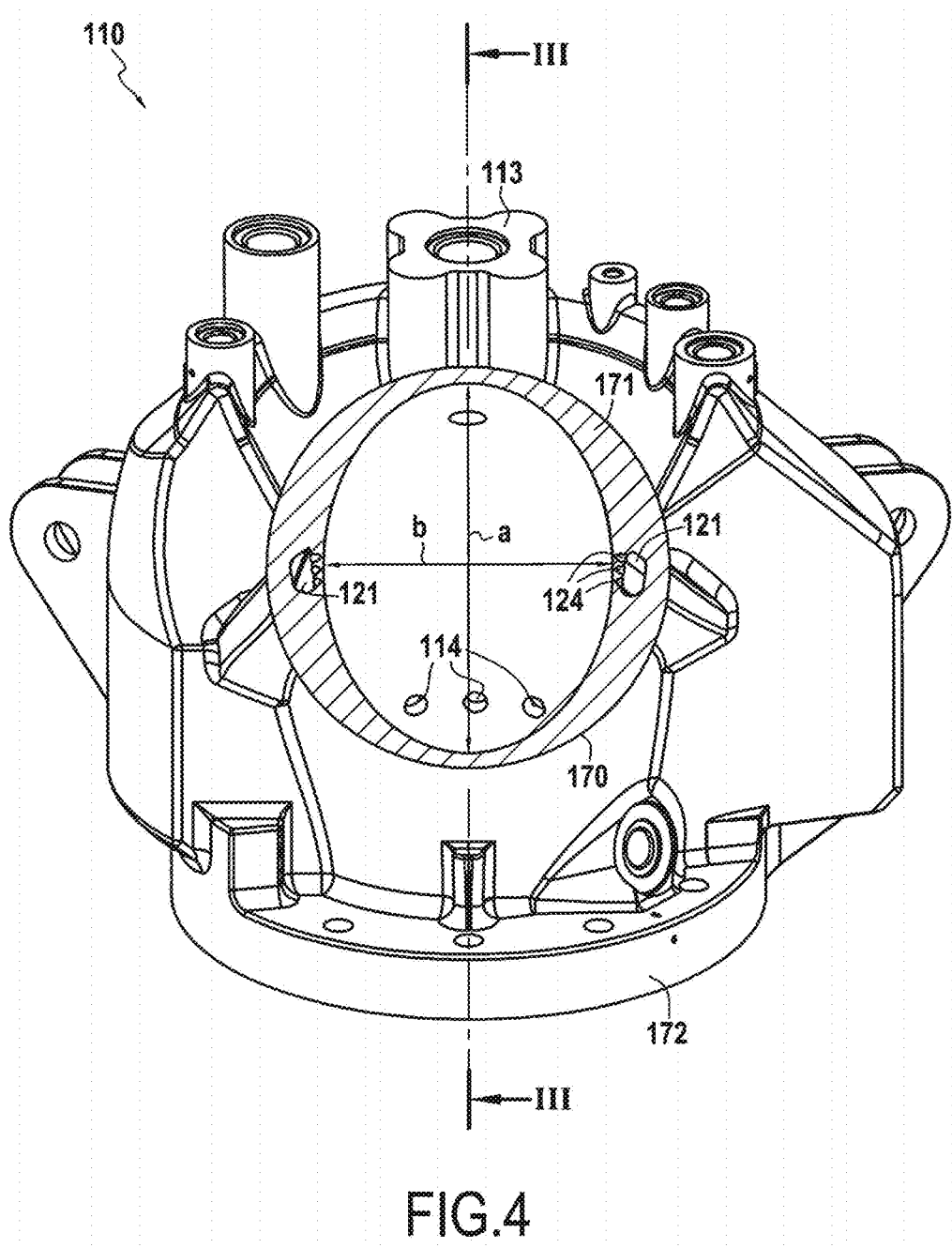
FIG. 4 is a view of the second embodiment of the pogo effect corrector system in section on plane IV of FIG. 3.
Figure 5:
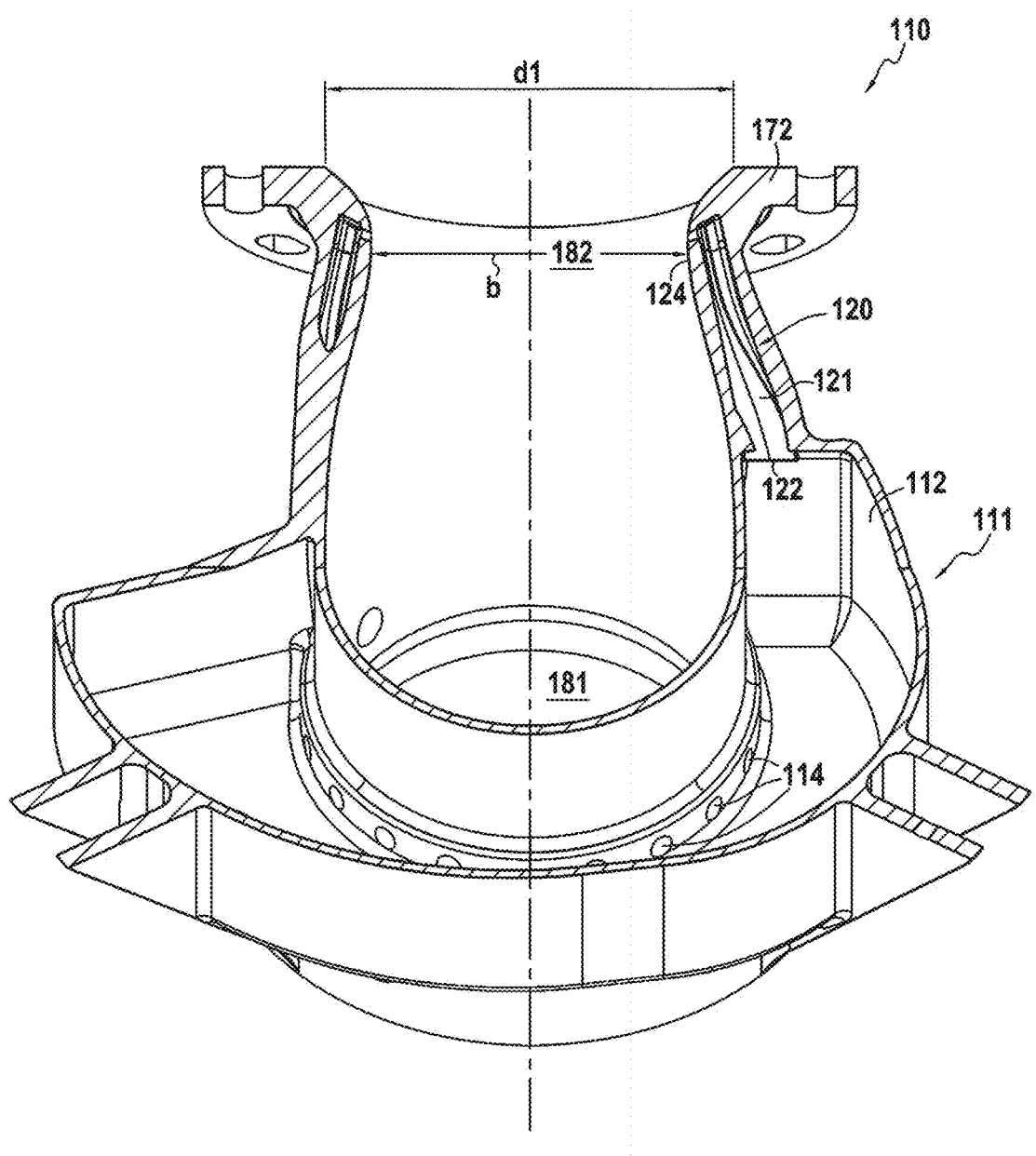
FIG. 5 is a view of the second embodiment of the pogo effect corrector system in folded section on plane V of FIG. 3.

FIGS. 3, 4, and 5 show a second embodiment of a PCS 110. This second embodiment is analogous to the first embodiment in numerous points, and only features that are specific to the second embodiment are therefore described in detail. In this embodiment, the PCS 110 is made as a single piece by additive manufacturing. It comprises a bend pipe portion 170 and a hydraulic accumulator 111 extending over substantially 180° around the pipe portion 170, on the outside of the bend.

In this second embodiment, and as can be seen more clearly in FIG. 4, the constriction section 182 is not formed by reducing the diameter of the pipe portion 170, but by making its wall 171 oval. More precisely, as in the first embodiment, the upstream and downstream ends 170m and 170v, each provided with a fastener flange 172, possess respective circular sections of diameter d1 corresponding to the nominal diameter of the pipe portion 170; in contrast, in the constriction segment 182, the pipe portion 170 possesses a cross-section that is elliptical. The major axis of the ellipse is aligned with the plane of the bend and it conserves a length that is constant and equal to the nominal diameter d1; in contrast, the minor axis b decreases continuously without any break of slope prior to reaching a minimum and then increases until returning once more to the nominal diameter d1 and thus to a cross-section that is circular.

The tank 112, which is C-shaped, is than provided around the pipe portion 170 over about 180°. The upper portion 112s of the tank 112 is provided with a gas injector 113. The lower portion 112i of the tank 112 is connected to the feed pipe portion 170 via a plurality of take-off orifices 114 formed through the wall 171 of the feed pipe portion 170 in the take-off segment 181 situated downstream from the constriction segment 182 and of diameter equal to the nominal diameter d1 of the pipe portion 170.

In this example, the hydraulic accumulator 111 has two diametrically opposite rejection passages 120 opening out firstly into the tank 112 at an intermediate level 115 between the upper and lower portions 112s and 112i of the tank 112, and secondly into the feed pipe portion 170 in its constriction section 182.

More precisely, in this example, each rejection passage 120 is in the form of a duct 121 formed in the wall 171 of the pipe portion 170 and extending between an inlet 122 open at the intermediate level 115 of the tank 112, and a group comprising a plurality of rejection orifices 124, specifically three orifices in alignment, that open out into the constriction segment 182 at the level where the minor axis b of the ellipse is at a minimum.

The operation of this second embodiment of a PCS 110 is analogous to that of the first embodiment.

Figure 6:
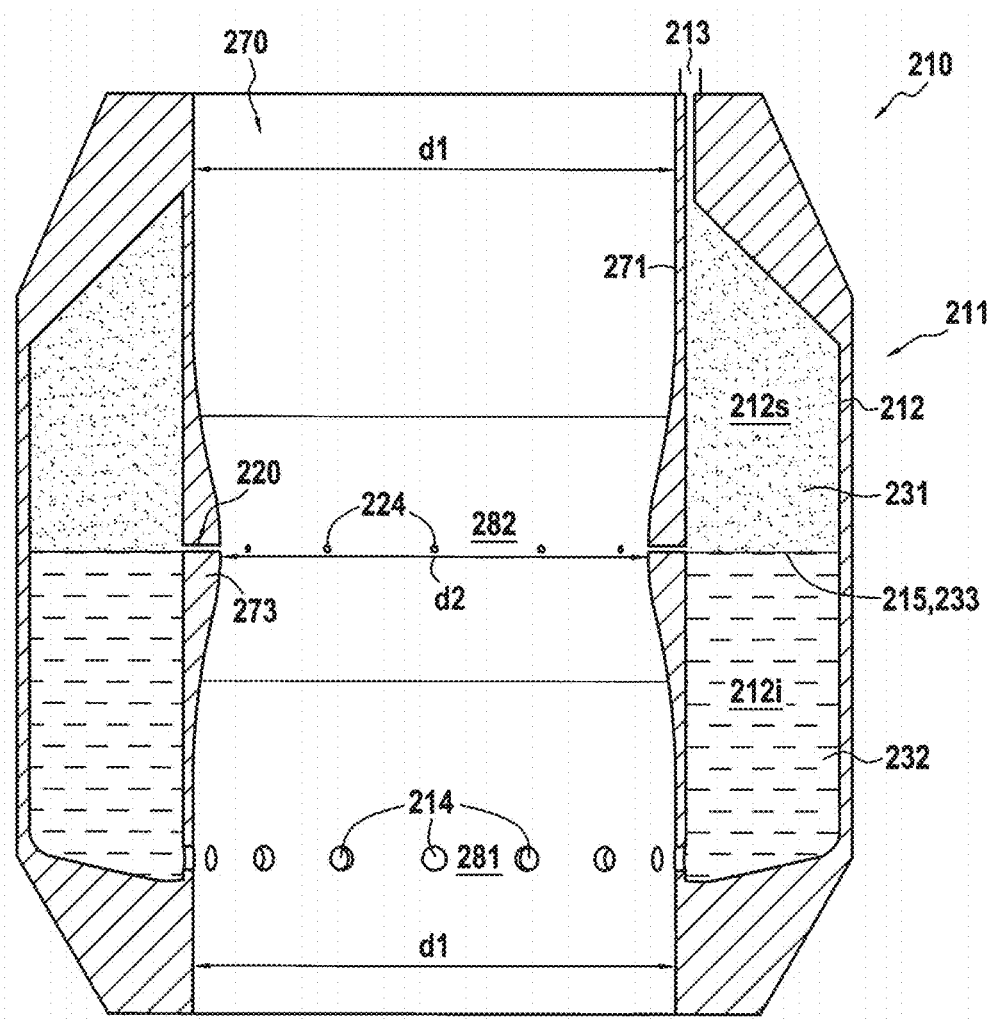
FIG. 6 is an axial section view of a third embodiment of a pogo effect corrector system.

FIG. 6 shows a third embodiment of a PCS 210. This third embodiment is analogous to the first embodiment in numerous points and only the features specific to this third embodiment are therefore described in detail. In this embodiment, the pipe portion 270 of the PCS 210 is axisymmetric and the hydraulic accumulator 211 surrounds the pipe portion 270 completely over 360°, the tank 212 being separated from the pipe portion 270 by the wall 271 only.

In this embodiment, and in analogous manner to the first embodiment, the flow section in the constriction segment 282 is reduced by narrowing the wall 271 so as to form a bottle neck 273 of nominal diameter d2 that is less than the nominal diameter d1 of the pipe portion 270.

A specific feature of this third embodiment is that the rejection passage 220 is constituted by no more than rejection orifices 224 that are regularly distributed all around the constriction segment 282, passing right through the wall 271 in order to open out into the tank 212 at the intermediate level 215.

Although the present invention is described with reference to specific embodiments, it is clear that modifications and changes may be undertaken on those embodiments without going beyond the general ambit of the invention as defined by the claims. In particular, individual characteristics of the various embodiments shown and/or mentioned may be combined in additional embodiments. Consequently, the description and the drawings should be considered in a sense that is illustrative rather than restrictive.

It is also clear that all of the features described with reference to a method can be transposed, singly or in combination, to a device, and conversely that all of the features described with reference to a device can be transposed, singly or in combination, to a method.

The invention claimed is:

1. A pogo effect corrector system for a liquid propellant feed system of a rocket engine, the corrector system comprising:
 a liquid propellant feed pipe portion connected to the rocket engine;
 a hydraulic accumulator comprising a tank provided with a gas feed and connected firstly to the feed pipe portion via at least one take-off passage opening out into a take-off segment of the feed pipe portion, and secondly via at least one rejection passage opening out into the tank at an intermediate level lying between said at least one take-off passage and the top of the tank;

wherein the feed pipe portion possesses a constriction segment where the flow section of the feed pipe portion is less than the flow section of the take-off segment; and wherein said at least one rejection passage opens out into the feed pipe portion at the constriction segment.

2. A pogo effect corrector system according to claim 1, wherein the flow section at the constriction segment is at least 1% less than the flow section of the take-off segment.

3. A pogo effect corrector system according to claim 1, wherein the flow section of the feed pipe portion varies continuously.

4. A pogo effect corrector system according to claim 1, wherein the diameter of the feed pipe portion is reduced at the constriction segment.

5. A pogo effect corrector system according to claim 1, wherein the constriction segment possesses a cross-section that is elliptical of major axis that is of constant length.

6. A pogo effect corrector system according to claim 1, wherein the feed pipe portion presents a bend.

7. A pogo effect corrector system according to claim 6, wherein the width of the feed pipe portion his constant in the plane of the bend.

8. A pogo effect corrector system according to claim 1, wherein the rejection passage opens out into the feed pipe portion via at least two diametrically opposite rejection orifices.

9. A pogo effect corrector system according to claim 1, wherein the constriction segment possesses a cross-section that is elliptical and wherein the rejection passage opens out into the feed pipe portion via at least one rejection orifice situated on the minor axis of the ellipse formed by the cross-section of the constriction segment.

10. A pogo effect corrector system according to claim 1, wherein the rejection passage opens out into the feed pipe portion via a plurality of rejection orifices distributed all around the feed pipe portion.

11. A pogo effect corrector system according to claim 1, wherein the rejection passage is constituted by one or more orifices formed through the wall of the feed pipe portion.

12. A rocket engine, including a pogo effect corrector system according to claim 1.

* * * * *